(12) United States Patent
Shin et al.

(10) Patent No.: US 9,859,751 B2
(45) Date of Patent: *Jan. 2, 2018

(54) SWITCHABLE UNINTERRUPTIBLE POWER SUPPLY SYSTEM AND BATTERY CHARGING METHOD THEREOF

(71) Applicant: LG CNS CO., LTD., Seoul (KR)

(72) Inventors: Dong Young Shin, Seoul (KR); Bon Jun Koo, Seoul (KR); In Chol Yeon, Seoul (KR); Byeong Gyu Hyeon, Seoul (KR)

(73) Assignee: LG CNS CO., LTD., Seoul (KR)

( * ) Notice: Subject to any disclaimer, the term of this patent is extended or adjusted under 35 U.S.C. 154(b) by 335 days.

This patent is subject to a terminal disclaimer.

(21) Appl. No.: 14/607,563

(22) Filed: Jan. 28, 2015

(65) Prior Publication Data

US 2016/0190865 A1 Jun. 30, 2016

(30) Foreign Application Priority Data

Dec. 29, 2014 (KR) .................. 10-2014-0192699

(51) Int. Cl.
*H02J 7/00* (2006.01)
*H02J 9/06* (2006.01)
*H02J 7/34* (2006.01)

(52) U.S. Cl.
CPC ................ *H02J 9/062* (2013.01); *H02J 7/34* (2013.01)

(58) Field of Classification Search
None
See application file for complete search history.

(56) References Cited

U.S. PATENT DOCUMENTS

| 7,307,360 | B2* | 12/2007 | Gonzales | G06F 1/30 307/139 |
| 2008/0203820 | A1* | 8/2008 | Kramer | H02J 3/38 307/64 |
| 2010/0253147 | A1* | 10/2010 | Ogg | H02J 9/061 307/65 |
| 2016/0190864 | A1* | 6/2016 | Yeon | H02J 7/0029 307/66 |

FOREIGN PATENT DOCUMENTS

| KR | 2019900003185 | 4/1990 |
| KR | 20140072692 A | 6/2014 |
| KR | 20140113185 A | 9/2014 |

* cited by examiner

*Primary Examiner* — Long Nguyen
(74) *Attorney, Agent, or Firm* — Lee, Hong, Degerman, Kang & Waimey

(57) ABSTRACT

A switchable uninterruptible power supply (SUPS) system is provided. The system includes a UPS configured to supply power to a load, a plurality of battery units connected in parallel, and a controller configured to selectively supply power from a grid to the UPS and to selectively connect each of the plurality of battery units the UPS or a battery charger are connected to the grid.

20 Claims, 5 Drawing Sheets

RELATED ART

SWITCHABLE UNINTERRUPTIBLE POWER SUPPLY SYSTEM AND BATTERY CHARGING METHOD THEREOF

CROSS-REFERENCE TO RELATED APPLICATION

This application claims the benefit and right of priority to Korean Patent Application No. 2014-0192699, filed on Dec. 29, 2014, the contents of which is incorporated herein by reference in its entirety.

Field of the Invention

The present invention relates to a switchable uninterruptible power supply (SUPS) system and a battery charging method and more particularly, to increasing a battery charging speed by selectively connecting a battery to an uninterruptible power supply (UPS) or a grid using a controller that controls the flow of power.

Discussion of Related Art

A UPS is a device capable of stably supplying power supplied from a grid or power discharged from a battery to a load in order to prevent a power supply from being stopped or an amount of supplied power from being rapidly changed.

FIG. 1 illustrates a schematic block diagram of an SUPS system 1 according to the related art. As illustrated in FIG. 1, the SUPS system 1 includes a grid 10, controller 20, a UPS 30, a battery 40 and a load 50 in which the battery is not directly connected to the grid but is connected to the UPS and the UPS uses some power supplied from the grid to recharge the battery.

The amount of power used by the UPS 30 to recharge the battery 40 should be less than the amount of power supplied from the grid. Therefore, it may take ten hours or more to completely recharge a dead battery using the UPS.

The SUPS system illustrated in FIG. 1 recharges the battery 40 in a low power-consumption period during which the amount of power used is low and supplies power from the battery to the load 50 in a peak power-consumption period during which the amount of power used is high. The controller 20 may block power delivered from the grid 10 to the UPS 30 such that the UPS may supply only power stored in the battery to the load.

When a long time is required to recharge the battery 40, the battery is not likely to be completely recharged and sufficient power may not be available when the battery is discharged in the peak power-consumption period. Therefore, there is a need to develop a technique of rapidly recharging the battery included in an SUPS system such that the battery may be completely recharged when a peak power-consumption period begins.

SUMMARY OF THE INVENTION

In one aspect of the invention, a switchable uninterruptible power supply (SUPS) system is provided. The system includes a UPS configured to supply power to a load, a plurality of battery units connected in parallel and a controller configured to selectively supply power from a grid to the UPS and selectively connect at least one of the plurality of battery units to the UPS or to a battery charger connected to the grid.

It is contemplated that the controller includes a plurality of charge control switches each configured to be opened and closed and to selectively connect one of the plurality of battery units to the UPS when closed, a plurality of diodes each connected in parallel with one of the plurality of charge control switches and a plurality of semiconductor devices each connected in parallel with one of the plurality of diodes and configured to be opened and closed. It is further contemplated that the controller is further configured to control each of the plurality of charge control switches to be closed during a peak power-consumption period.

It is contemplated that the controller is further configured to determine a state of charge (SOC) of each of the plurality of battery units and control the charge control switch of a corresponding battery unit to be open when the determined SOC of the corresponding battery unit decreases to a predetermined level during the peak power-consumption period. It is further contemplated that the controller is further configured to control each of the plurality of semiconductor devices to be open after the corresponding semiconductor device has been controlled to be closed and the SOC of the corresponding battery unit increases above the predetermined level.

It is contemplated that the controller includes a plurality of charge changeover switches each configured to connect one of the plurality of battery units to the battery charger or the UPS. It is further contemplated that the controller is further configured to not supply power from the grid to the UPS and to connect at least one of the plurality of battery units to the UPS during a peak power-consumption period.

It is contemplated that the controller is further configured to determine a state of charge (SOC) of each of the plurality of batter units and supply power from the grid to the UPS when the determined SOC of each of the plurality of battery units decreases to a predetermined level during the peak power-consumption period. It is further contemplated that the system further includes a circuit configured to determine a state of charge (SOC) of each of the plurality of battery units where the controller is further configured to discharge at least one of the plurality of battery units the determined SOC of which is high in order to equalize the SOC of battery units connected to the UPS.

It is contemplated that the controller is further configured to determine a charge level of each of the plurality of batter units and control an amount of power supplied from the battery charger to each of the plurality of battery units based upon the corresponding determined charge level. It is further contemplated that the controller is further configured to control each battery unit connected to the UPS to not be discharged below a predetermined level. Moreover, it is contemplated that the system further includes a user interface unit configured to display flow of power and states of charge of each of the plurality of battery units.

In another aspect of the invention, a method of controlling a switchable uninterruptible power supply (SUPS) system including a plurality of battery units connected in parallel and a UPS is provided. The method includes selectively supplying power from a grid to the UPS and selectively connecting at least one of the plurality of battery units to the UPS or to a battery charger connected to the grid.

It is contemplated that the method further includes connecting each of the plurality of battery units to the UPS during a peak power-consumption period. It is further contemplated that the method further includes determining a state of charge (SOC) of each of the plurality of battery units and disconnecting a corresponding battery unit from the UPS when the determined SOC of the corresponding battery unit decreases to a predetermined level during the peak power-consumption period.

It is contemplated that the method further includes determining a state of charge (SOC) of each of the plurality of battery units and controlling the grid to supply power to the UPS when the determined SOC of each of the plurality of battery units decreases to a predetermined level during the peak power-consumption period. It is further contemplated that the method further includes determining states of charge (SOC) of each of the plurality of battery units and discharging at least one of the plurality of battery units the determined SOC of which is high in order to equalize the SOC of battery units connected to the UPS.

It is contemplated that the method further includes determining a charge level of each of the plurality of battery units and controlling an amount of power supplied from the battery charger to each of the plurality of battery units based upon the corresponding determined charge level. It is further contemplated that the method further includes controlling each battery unit connected to the UPS to not be discharged below a predetermined level. Moreover, it is contemplated that the method further includes displaying flow of power and states of charge of each of the plurality of battery units.

BRIEF DESCRIPTION OF THE DRAWINGS

The above and other objects, features, and advantages of the present invention will become more apparent to those of ordinary skill in the art by describing in detail embodiments thereof with reference to the accompanying drawings, in which.

DETAILED DESCRIPTION OF EMBODIMENTS

Figure 1:
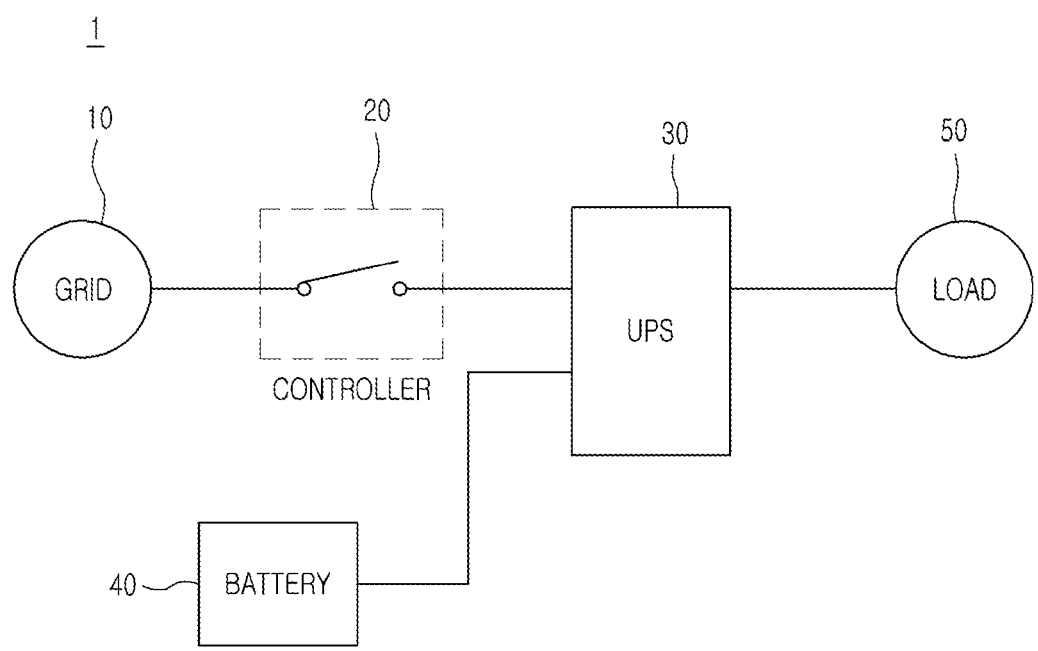
FIG. 1 illustrates a schematic block diagram of an SUPS system according to the related art.

Embodiments of the present invention will be described in detail with reference to the accompanying drawings. In the drawings, like reference numerals refer to like elements throughout.

The present invention may have different forms and should not be construed as being limited to the embodiments set forth herein. In the drawings, components of the present invention that are not related to explaining the present invention are omitted.

It will be understood that when an element or layer is referred to as being "connected to" another element or layer, the element or layer can be directly connected to another element or layer or be indirectly connected to another element or layer having intervening elements or layers therebetween. It will be further understood that the terms "comprise" and/or "comprising" and "include" and/or "including" used in this specification specify the presence of stated features, integers, steps, operations, elements, and/or components, but do not preclude the presence or addition of one or more other features, integers, steps, operations, elements, components, and/or groups thereof.

Figure 2:
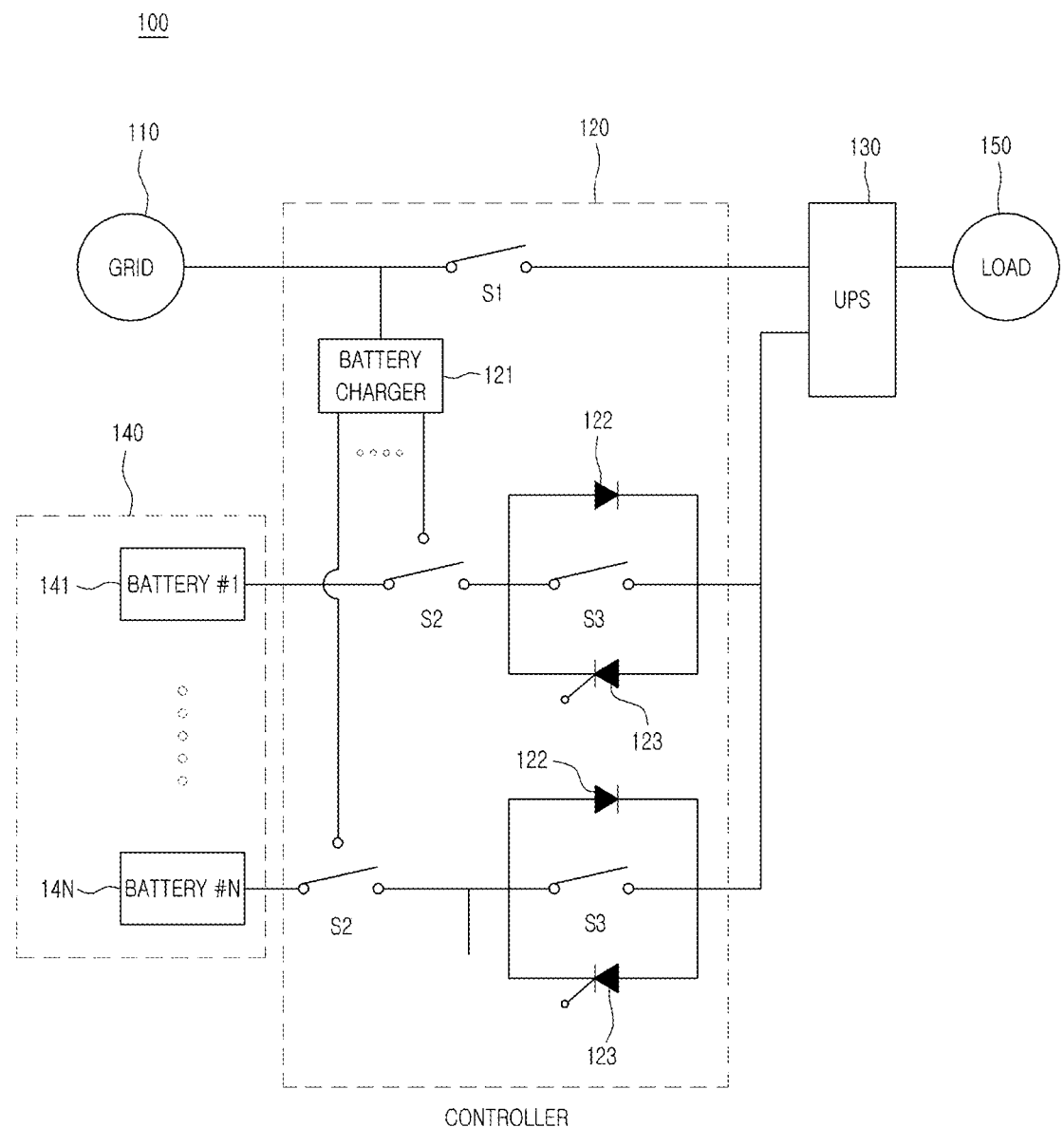
FIG. 2 illustrates a schematic block diagram of an SUPS system according to an embodiment of the present invention.

FIG. 2 illustrates a schematic block diagram of a SUPS system 100 according to an embodiment of the present invention. As illustrated in FIG. 2, the SUPS system includes a controller 120, a UPS 130, and a battery 140 including battery units 141 to 14N, and is connected to a grid 110 and a load 150.

The grid 110 may be an electric power network, such as the Korean Electric Power Corporation (KEPCO), to which companies that sell electric power generated by operating a power plant are connected. A manager of the controller 120 and the UPS 130 may pay charges for electric power supplied from the grid at predetermined time intervals.

The controller 120 is installed between the grid 110 and UPS 130 and the battery 140. The controller may distribute electric power supplied from the grid to the UPS and the battery. The controller may also be referred to as a switchable-UPS controller or an SUPS controller.

The controller 120 may include a capacitive switch S1 configured to be open/closed, a battery charger 121, and at least one diode 122, and corresponding semiconductor device 123, charge changeover switch S2 and charge control switch S3 each configured to be opened/closed. Each capacitive switch and charge control switch may be controlled to be in an 'on'/'off' state. Each charge changeover switch may be selectively connected to the battery charger or the UPS 130 in an "on" state or controlled to be in an 'off' state in which it is connected to neither the battery charger nor the UPS.

The controller 120 may be controlled by a control unit (not shown). The control unit may control the controller by communicating with the UPS 130.

The controller 120 may be controlled by an energy management system (EMS). The EMS may set up a power management plan, control the controller and UPS 130 based on the power management plan and receive and analyze information related to states of the grid 110, the controller, the UPS, the battery 140, and the load 150.

The SUPS system 100 may include a user interface unit (not shown) configured to display the information related to the states of the grid 110, the controller 120, the UPS 130, the battery 140, and the load 150 such that a user who manages the overall operations of the SUPS system may view the information. The user interface unit may display the flow of power from various components of the SUPS system, states of charge (SoC) of the battery and a speed of recharging the battery such that the user may view them. The user may input information via the user interface with the information used to set up the power management plan.

The controller 120 may deliver power supplied from the grid 110 to the UPS 130. The capacitive switch S1 connects the UPS and the grid to each other in an 'on' state or disconnects them from each other in an 'off' state. The controller may control the capacitive switch to be in the 'off' state during a peak power-consumption period during which the maximum amount of power is consumed by the load 150 such that the UPS supplies power charged in the battery to the load.

When power supplied from the grid 110 is stopped or unstable due to an emergency situation, such as a power failure, the controller 120 may control the capacitive switch S1 to be 'open' in the 'off' state in order to prevent malfunction of the UPS 130 and allow the UPS to rapidly use power of the battery 140. For management of the SUPS system 100, the controller may determine whether the UPS operates normally in an emergency state by controlling the capacitive switch to be in the 'off' state, connecting the battery to the UPS, and monitoring the flow of power.

The battery charger 121 may be directly connected to the grid 110 and simultaneously recharge battery units among the battery units 141 to 14N that are connected to the battery charger. The battery charger performs only a function of recharging the battery units while the UPS 130 performs various functions in the SUPS system 100. Therefore, the battery units may be recharged with a larger amount of power when recharged by the battery charger than when the battery units are recharged by the UPS. Accordingly, the speed of recharging the battery units may be enhanced.

When the battery units 141 to 14N are recharged by the UPS 130, the battery units are likely to be alternately recharged and discharged and the lifespan of the battery units may decrease. In contrast, when the battery units are recharged by the battery charger 110, the battery units may be more efficiently recharged in order to increase their lifespan.

A plurality of battery chargers 110 may be included in the controller 120 and may each recharge at least one of the battery units 141 to 14N. The battery units may be connected in parallel with the controller, as illustrated in FIG. 2, and each battery unit may be a group of batteries connected in series. The battery units may include lithium ion batteries (Lib).

The battery units 141 to 14N may be connected to the battery charger 110 or the UPS 130 via the charge changeover switch S2 included in the controller 120. The controller may include a number of charge changeover switches equal to a number of battery units.

Although not shown, the SUPS system 100 may include a battery management system (BMS) for monitoring the states of the battery units 141 to 14N. The BMS may include a circuit for measuring an amount of power charged in the battery units and may communicate with the controller 120 and the EMS.

The BMS may determine a total SoC of the battery units 141 to 14N and the speeds of recharging and discharging the battery units in order to determine whether the battery units malfunction. The BMS may disconnect a malfunctioning battery unit from the controller 120.

Each charge changeover switch S2 selectively connects one of the battery units 141 to 14N to the battery charger 110 or the UPS 130. Each charge changeover switch may select whether the corresponding battery unit is to be connected to the battery charger or the UPS under control of the control unit or the UPS that controls the controller 120.

Each charge changeover switch S2 may connect the corresponding battery unit to a discharging unit (not shown) rather than the battery charger 110 or the UPS 130 in order to discharge the battery or may control the corresponding battery unit to not be connected to any component such that the battery unit may be in a floating state in which it is neither recharged nor discharged. The controller 120 may include a connection unit (not shown) between each charge changeover switch and the UPS such that when the battery units are each connected to the UPS by the corresponding charge changeover switch, the flow of power may be controlled by the connection unit.

The connection unit may include the diodes 122, the charge control switches S3, and the semiconductor devices 123. The diodes charge the charge control switches and the semiconductor devices may be installed in parallel as illustrated in FIG. 2.

Each semiconductor device 123 may be a silicon-controlled rectifier (SCR). When the semiconductor devices are SCRs, each semiconductor device may be controlled using a gate terminal of the corresponding SCR.

The number of the connection units may be equal to the number of the battery units 141 to 14N. First ends of the connection units may be connected in parallel to the UPS 130.

A charge control switch S3 is in an 'off' state when 'open' and the UPS 130 is prevented from recharging the corresponding battery unit 141 to 14N. A charge control switch is in an 'on' state when 'closed' and the UPS may recharge the corresponding battery unit and power discharged from the battery unit may be supplied to the UPS via the same path via which the battery unit is recharged by the UPS.

Each diode 122 may be configured to supply power stored in the corresponding battery unit 141 to 14N to the UPS 130 even when the corresponding charge control switch S3 is 'open' or in the 'off' state. The diode is a device that controls an electric current to flow from an anode to a cathode but prevents an electric current from flowing from the cathode to the anode. Each diode is located such that the anode is connected to the corresponding battery unit and the cathode is connected to the UPS.

When a switch through which an electric current flows is suddenly controlled to be 'open' or in the 'off' state, an arc may be generated due to an overvoltage occurring when an electric current is forcibly blocked and a transient recovery voltage occurs according to the state of a circuit. Each semiconductor device 123 prevents an arc from being generated when the corresponding charge control switch S3 is controlled to be in the 'open' or 'off' state while the corresponding battery unit 141 to 14N is recharged by the UPS 130.

Even if the charge control switch S3 is in the 'open' or 'off' state, an arc is prevented from being generated since an electric current may flow through the corresponding semiconductor device 123. The semiconductor device is located such that an electric current flows through the semiconductor device in a direction opposite to a direction in which an electric current flows through the corresponding diode 122.

As previously described, each semiconductor device 123 may be an SCR. When the semiconductor device is an SCR, an actuating signal such as an impulse signal may be supplied to a gate terminal of the SCR to cause an electric current to pass through before the corresponding charge control switch S3 is controlled to be in the 'open' or 'off' state. Thereafter, the SCR may be controlled to block an electric current flowing from the UPS 130 to the corresponding battery unit 141 to 14N, thereby preventing an arc from being generated.

The UPS 130 is supplied with power from the grid 110 or the battery 140 and supplies power to the load 150 under control of the controller 120. When power supplied from the grid is blocked or unstable, the UPS may supply power from the battery to the load. The UPS may also recharge the battery with the power supplied from the grid during a time period during which a low amount of power is consumed by the load. The load is a device that consumes power supplied from the UPS and may include various devices operated with electric energy.

Figure 3:
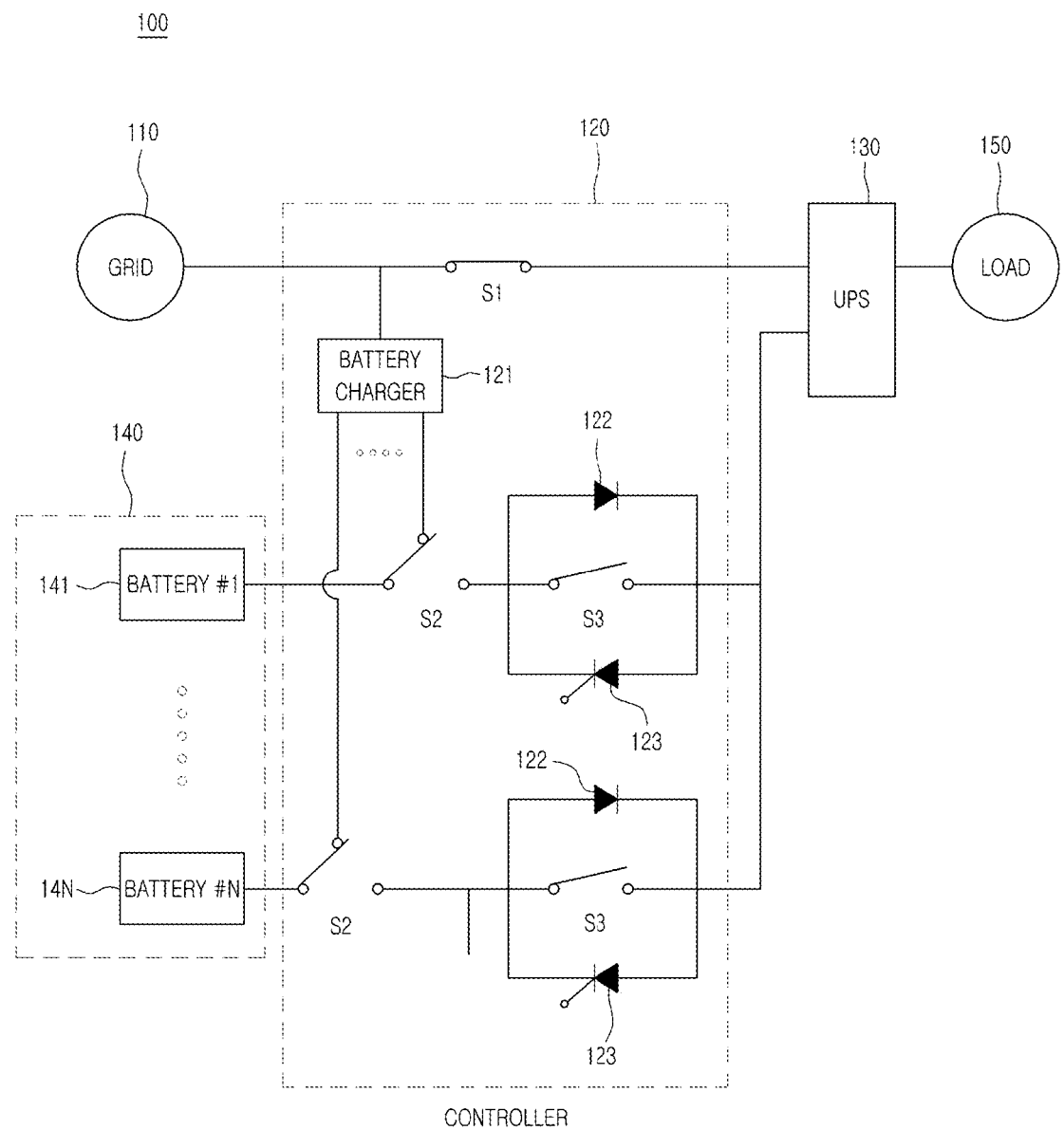
FIG. 3 illustrates a block diagram of the SUPS system of FIG. 2 in a state in which battery units are recharged according to an embodiment of the present invention.

FIG. 3 illustrates a block diagram of the SUPS system 100 of FIG. 2 in a state in which battery units 141 to 14N are recharged according to an embodiment of the present invention. As illustrated in FIG. 3, the battery units and the battery charger 110 are connected via the corresponding charge changeover switch S2.

The battery units 141 to 14N may be recharged with not only power supplied from the grid 110 via the battery charger 121 but also with power supplied from the UPS 130. Since the UPS uses only a portion of power supplied from the grid to recharge the battery units, a speed of recharging the battery units may be slower than when the battery units are connected to the battery charger.

The controller 120 may determine the SoC of the battery units 141 to 14N by using the BMS. Since the SoC of the battery units is proportional to a voltage of the battery units, the SoC of each battery unit may be determined by measuring its voltage. Alternatively, the SoC of each battery unit may be determined according to a chemical method.

The controller 120 may control a charge changeover switch S2 to connect a corresponding battery unit 141 to 14N, the SoC of which is lower than a predetermined level, to the battery charger 121 in a general driving mode of the SUPS system 100 other than an emergency situation. In contrast, the controller may control a charge changeover switch to connect a corresponding battery unit that is currently being recharged by being connected to the battery charger, the SoC of which is equal to or greater than the predetermined level, to the UPS 130.

The controller 120 may control all the battery units 141 to 14N to not be connected to the battery charger 121. In this way, at least one battery unit should be connected to the UPS 130 such that the UPS may supply power to the load 150 via the at least one battery unit in an emergency situation, such as when power supplied from the grid 110 is suddenly blocked.

The controller 120 may control the exchange of battery units 141 to 14N with new battery units based on a power management plan set up by the EMS. The controller and EMS may also receive information related to the states of the battery units from the BMS and control the exchange of battery units with new battery units based on the received information. For example, during a time period during which power is expected to be stably supplied, the grid 110 may increase a cycle of exchanging the battery units in order to increase the efficiency of recharging the battery units and decrease a reference SoC based on which battery units connected to the UPS 130 are to be exchanged.

The controller 120 may control at least one battery unit 141 to 14N or a predetermined number of battery units to be connected to the UPS 130. The controller may also control the product of the number of battery units connected to the UPS and the SoC of the battery units to be equal to or greater than a predetermined value and select whether the battery units are to be connected to the battery charger 121 or the UPS based on the power management plan set up by the EMS.

The controller 120 may control the battery units 141 to 14N connected to the UPS 130 to not be discharged to a predetermined SoC or less. In order to accomplish this, the controller may connect battery units that are presently connected to the battery charger 121 to the UPS and connect battery units that are presently being discharged to the battery charger before the battery units connected to the UPS are discharged to the predetermined SoC or less. When a battery unit is completely recharged, the controller may control no power to be supplied to the completely recharged battery unit.

Figure 4:
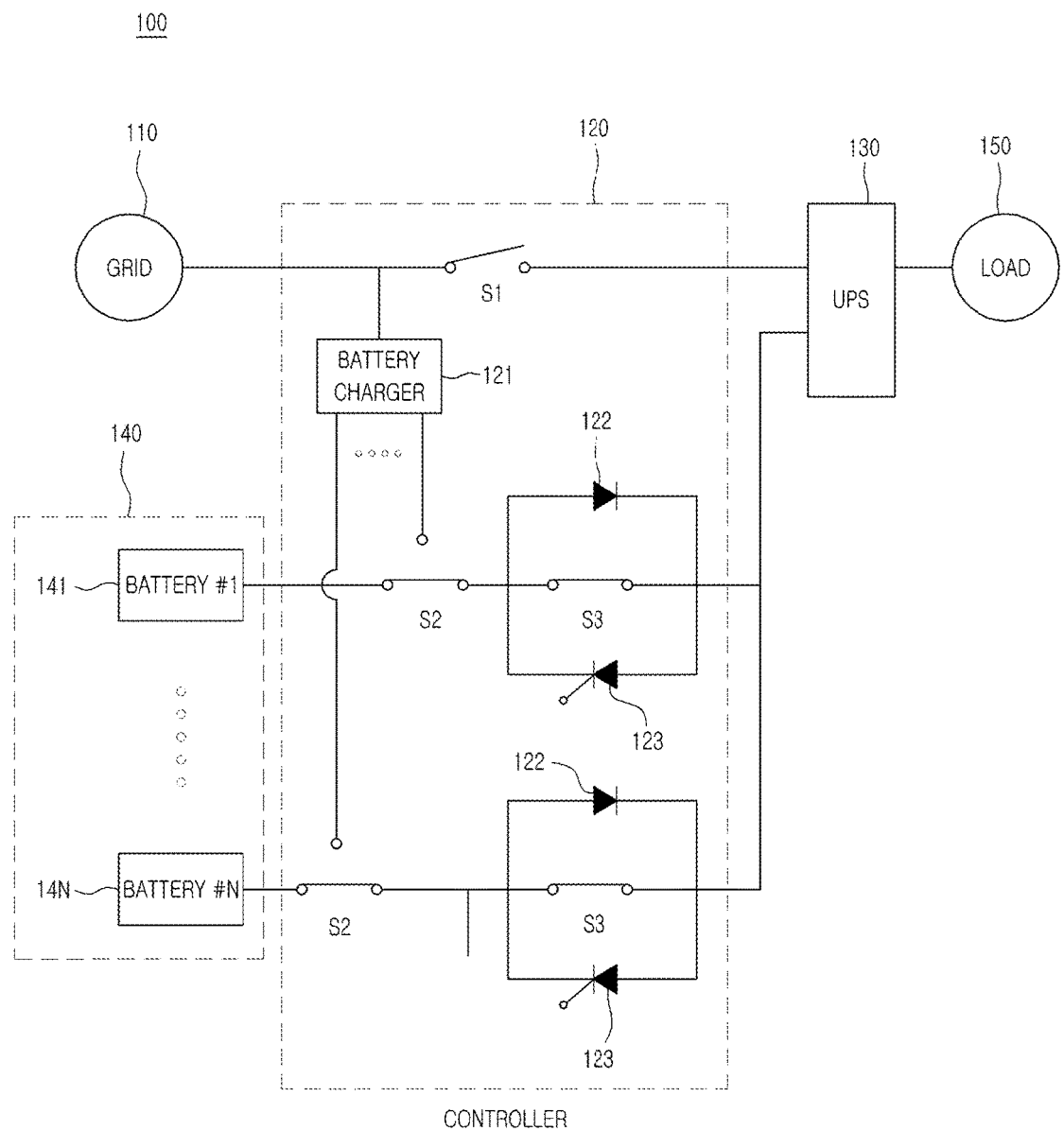
FIG. 4 illustrates a block diagram of the SUPS system of FIG. 2 in a state in which battery units are discharged according to an embodiment of the present invention.

FIG. 4 illustrates a block diagram of the SUPS system 100 of FIG. 2 in a state in which battery units 141 to 14N are discharged according to an embodiment of the present invention. As illustrated in FIG. 4, the charge changeover switches S2 connect the battery units to the UPS 130.

As described previously, the controller 120 may include a connection unit between a terminal of the controller connected to the UPS 130 and the charge changeover switch S2. The controller may control the SoC of battery units 141 to 14N connected to the UPS to be the same. Since the battery units are connected in parallel, the battery units may malfunction when power is simultaneously supplied to the UPS from the battery units if the SoCs are different.

In order to equalize the SoC of the battery units 141 to 14N, the controller 120 may connect only a battery unit having a highest SoC to the UPS 130 in order to discharge the battery unit. When the SoC of the battery unit connected to the UPS decreases to be equal to the SoCs of the other battery units, the other battery units may also be connected to the UPS.

Similarly, the controller 120 may check the SoC in real time of battery units 141 to 14N that are being recharged while connected to the battery charger 121. The controller may switch the corresponding charge changeover switches S2 to connect the battery units being recharged by the battery charger to the UPS 130 when the SoC of the battery units becomes equal to the SoC of the battery units already connected to the UPS.

In order to equalize the SoC of the battery units 141 to 14N connected to the UPS 130, the controller 120 may also discharge the battery units by connecting them to an additional discharging unit (not shown) rather than to the battery charger 121 or the UPS, thereby rapidly equalizing the SoC of the battery units when the SoCs of the battery units are different. The controller may also control the battery units to be in a floating state in which the battery units are not connected to any device. Even if the SoC of the battery units is not controlled via the charge changeover switches S2, a reverse current may be prevented by the corresponding diode 122 from flowing into a battery unit, the SoC of which is lower than SoCs of the other battery units.

The controller 120 may analyze the amount of power consumed by the load 150 or receive information related to the amount of the consumed power from the EMS. The controller may then control the capacitive switch S1 to be in the 'open' or 'off' state in a peak power-consumption period during which a maximum amount of power is used such that the load may use power supplied from the battery units 141 to 14N via the UPS 130.

As described previously, when the battery units 141 to 14N supply power to the load 150 via the UPS 130, the controller 120 may control the corresponding charge control switches S3 to be in the 'closed' or 'on' state. When a charge control switch is in the 'open' or 'off' state, the corresponding battery unit is recharged only via the corresponding diode 120 and power loss may occur due to resistors included in the diode when an electric current flows through the diode. Therefore, the controller may control a charge control switch to be in the 'closed' or 'on' state to discharge the corresponding battery units and resistance of a line via which discharging is performed may decrease and power efficiency may increase.

Figure 5:
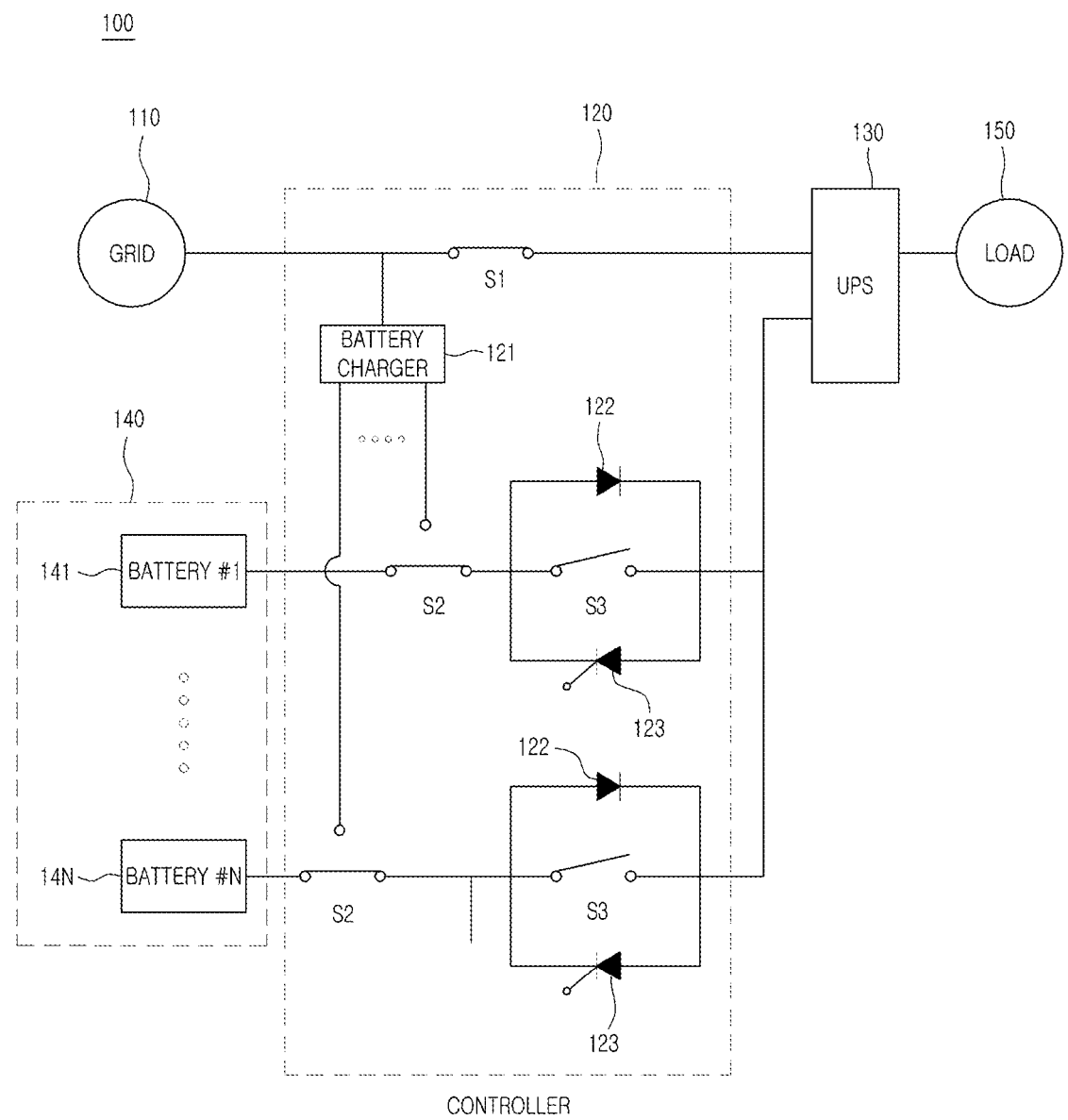
FIG. 5 illustrates a block diagram of the SUPS system of FIG. 2 in a state in which battery units are prevented from being recharged according to an embodiment of the present invention.

FIG. 5 illustrates a block diagram of the SUPS system 100 of FIG. 2 in a state in which battery units 141 to 14N are prevented from being recharged according to an embodiment of the present invention. As illustrated in FIG. 5, even if the battery units are discharged during a peak power-consumption period as illustrated in FIG. 4, the amount of power to be consumed by the load 150 cannot be supplied only via the battery units when the SoC of the battery units decreases to a predetermined level or less before the peak power-consumption period ends. Therefore, the controller 120 may control a capacitive switch S1 that is 'open' or 'off' to be in the 'closed' or 'on' state such that power may be supplied again from the grid 110 to the UPS 130.

The UPS 130 may not only receive power from the battery units 141 to 14N but also may supply power to recharge the battery units. The UPS may detect that the SoC of the battery units is low and recharge the battery units with power supplied from the grid 101.

The described operation of the UPS 130 may not only decrease the efficiency of using power but also decrease the lifespan of the battery units 141 to 14N due to meaningless repetitive recharging and discharging of the battery units during a peak power-consumption period. Therefore, the controller 120 may control the charge control switches S3 of a connection unit that connects the charge changeover switches S2 to the UPS to be in the 'open' or 'off' state in order to open a path via which the battery units are recharged and the UPS may supply emergency power via the diodes 120 of the connection unit.

The battery units 141 to 14N may supply stored power to the load 150 in a peak power-consumption period during which a maximum amount of power is used in order to stably operate the SUPS system 100. Therefore, as much power as possible should be stored when a low amount of power is used.

The lifespan of the battery units 141 to 14N should be managed while the efficiency of recharging the battery units is maximized. As described previously, the battery units may be prevented from being recharged via the UPS 130 and be directly connected to the grid 110 in order to stably supply a certain amount of power and may be recharged primarily by the battery charger 121 that performs only recharging of the battery units, thereby rapidly recharging the battery units. In this way, the SUPS system 100 may more stably supply power during a peak power-consumption period.

According to the present invention, battery units may be recharged by directly supplying power from a grid rather than a UPS, thereby increasing a speed of recharging the battery units. Therefore, during a peak power-consumption period, an effect of discharging the battery units may be maximized since they may be sufficiently recharged.

According to the present invention, battery units may be efficiently recharged and discharged, thereby increasing their lifespan.

Advantages of the present invention are not limited to those described and should be understood as including all various effects that are derivable from the detailed description and the claims.

The embodiments of the present invention have been described for a better understanding. It would be obvious to those of ordinary skill in the art that the present invention may be embodied in many different forms without departing from the technical idea or essential characteristics of the present invention.

Therefore, the embodiments should be considered as descriptive only and not as limiting. For example, components that have been described as being included in a single form may be embodied in plurality. Similarly, components that have been described in plurality may be embodied in a combined form. The scope of the present invention is defined in the following claims, and all modifications, equivalents, and alternatives that are derivable from the definition and of the claims and equivalent concepts are construed as being within the scope of the present invention.

What is claimed is:

1. A switchable uninterruptible power supply (SUPS) system comprising:
   an uninterruptible power supply (UPS) configured to supply power to a load;
   a plurality of battery units connected in parallel and provided external to the UPS; and
   a controller provided between a grid and the UPS and configured to:
   selectively supply power from the grid to the UPS; and
   selectively connect at least one of the plurality of battery units to the UPS or to a battery charger connected to the grid.

2. The system of claim 1, further comprising:
   a plurality of charge control switches each configured to be opened and closed and to selectively connect one of the plurality of battery units to the UPS when closed;
   a plurality of diodes each connected in parallel with one of the plurality of charge control switches; and
   a plurality of semiconductor devices each connected in parallel with one of the plurality of diodes and configured to be opened and closed.

3. The system of claim 2, wherein the controller is further configured to control each of the plurality of charge control switches to be closed during a peak power-consumption period.

4. The system of claim 3, wherein the controller is further configured to:
   determine a state of charge (SOC) of each of the plurality of battery units; and
   control the charge control switch of a corresponding battery unit to be open when the determined SOC of the corresponding battery unit decreases to a predetermined level during the peak power-consumption period.

5. The system of claim 4, wherein the controller is further configured to control each of the plurality of semiconductor devices to be open after the corresponding semiconductor device has been controlled to be closed and the SOC of the corresponding battery unit increases above the predetermined level.

6. The system of claim 1, further comprising a plurality of charge changeover switches each configured to connect one of the plurality of battery units to the battery charger or the UPS.

7. The system of claim 1, wherein the controller is further configured to not supply power from the grid to the UPS and to connect at least one of the plurality of battery units to the UPS during a peak power-consumption period.

8. The system of claim 7, wherein the controller is further configured to:
   determine a state of charge (SOC) of each of the plurality of battery units; and
   supply power from the grid to the UPS when the determined SOC of each of the plurality of battery units decreases to a predetermined level during the peak power-consumption period.

9. The system of claim 1, further comprising a circuit configured to determine a state of charge (SOC) of each of the plurality of battery units, wherein the controller is further configured to discharge at least one of the plurality of battery units having a determined SOC that is high in order to equalize the SOC of battery units connected to the UPS.

10. The system of claim 1, wherein the controller is further configured to:
    determine a charge level of each of the plurality of battery units; and
    control an amount of power supplied from the battery charger to each of the plurality of battery units based upon the corresponding determined charge level.

11. The system of claim 1, wherein the controller is further configured to control each battery unit connected to the UPS such that the corresponding battery unit is not discharged below a predetermined level.

12. The system of claim 1, further comprising a user interface unit configured to display flow of power and states of charge of each of the plurality of battery units.

13. A method of controlling a switchable uninterruptible power supply (SUPS) system including an uninterruptible power supply (UPS) and a plurality of battery units connected in parallel and provided external to the UPS, the method performed by a controller provided between a grid and the UPS and comprising:
   selectively supplying power from the grid to the UPS; and
   selectively connecting at least one of the plurality of battery units to the UPS or to a battery charger connected to the grid.

14. The method of claim 13, further comprising:
   connecting each of the plurality of battery units to the UPS during a peak power-consumption period.

15. The method of claim 14, further comprising:
   determining a state of charge (SOC) of each of the plurality of battery units; and
   disconnecting a corresponding battery unit from the UPS when the determined SOC of the corresponding battery unit decreases to a predetermined level during the peak power-consumption period.

16. The method of claim 14, further comprising:
   determining a state of charge (SOC) of each of the plurality of battery units; and
   controlling the grid to supply power to the UPS when the determined SOC of each of the plurality of battery units decreases to a predetermined level during the peak power-consumption period.

17. The method of claim 13, further comprising:
   determining states of charge (SOC) of each of the plurality of battery units; and
   discharging at least one of the plurality of battery units having a determined SOC that is high in order to equalize the SOC of battery units connected to the UPS.

18. The method of claim 13, further comprising:
   determining a charge level of each of the plurality of battery units; and
   controlling an amount of power supplied from the battery charger to each of the plurality of battery units based upon the corresponding determined charge level.

19. The method of claim 13, further comprising controlling each battery unit connected to the UPS such that the corresponding unit is not discharged below a predetermined level.

20. The method of claim 13, further comprising displaying flow of power and states of charge of each of the plurality of battery units.

* * * * *